United States Patent
Patterson et al.

(10) Patent No.: US 7,098,931 B2
(45) Date of Patent: Aug. 29, 2006

(54) IMAGE MANAGEMENT SYSTEM AND METHODS USING DIGITAL WATERMARKS

(75) Inventors: Phillip R. Patterson, Sherwood, OR (US); Lorie Clements, Portland, OR (US); Neil A. Lofgren, White Salmon, WA (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 287 days.

(21) Appl. No.: 09/858,336

(22) Filed: May 15, 2001

(65) Prior Publication Data

US 2002/0124024 A1    Sep. 5, 2002

Related U.S. Application Data

(63) Continuation-in-part of application No. 09/800,093, filed on Mar. 5, 2001.

(60) Provisional application No. 60/284,776, filed on Apr. 18, 2001, provisional application No. 60/284,163, filed on Apr. 16, 2001.

(51) Int. Cl.
    *G09G 5/02*    (2006.01)
(52) U.S. Cl. ................ 345/634; 382/100; 382/232; 713/176; 380/51; 380/54
(58) Field of Classification Search .......... 382/232, 382/100; 709/217; 713/200, 170, 176; 345/634
    See application file for complete search history.

(56) References Cited

U.S. PATENT DOCUMENTS

| 4,504,910 | A | 3/1985 | Araki et al. |
| 4,631,678 | A | 12/1986 | Angermüller |
| 5,214,757 | A | 5/1993 | Mauney et al. ............. 395/161 |
| 5,329,108 | A | 7/1994 | Lamoure |
| 5,385,371 | A | 1/1995 | Izawa .......................... 283/34 |
| 5,502,576 | A | 3/1996 | Ramsay et al. |
| 5,664,018 | A | 9/1997 | Leighton ..................... 380/54 |
| 5,721,788 | A | 2/1998 | Powell ........................ 382/100 |
| 5,748,783 | A | 5/1998 | Rhoads ....................... 382/232 |
| 5,764,770 | A | 6/1998 | Schipper et al. |
| 5,765,152 | A | 6/1998 | Erickson ........................ 707/9 |
| 5,799,082 | A | 8/1998 | Murphy et al. |
| 5,812,962 | A | 9/1998 | Kovac |
| 5,825,892 | A | 10/1998 | Braudaway et al. .......... 380/51 |
| 5,861,841 | A | 1/1999 | Gildea et al. ............... 342/357 |
| 5,864,623 | A | 1/1999 | Messina et al. |
| 5,889,868 | A | 3/1999 | Moskowitz et al. .......... 380/51 |
| 5,889,898 | A | 3/1999 | Koren et al. .................... 385/9 |
| 5,892,900 | A | 4/1999 | Ginter ......................... 713/200 |
| 5,901,178 | A | 5/1999 | Lee et al. |

(Continued)

FOREIGN PATENT DOCUMENTS

EP    0 947 953 A2    10/1999

(Continued)

OTHER PUBLICATIONS

U.S. Appl. No. 09/571,422, filed May 15, 2000, Rhoads et al.

(Continued)

*Primary Examiner*—Kee M. Tung
*Assistant Examiner*—Jin-Cheng Wang
(74) *Attorney, Agent, or Firm*—Digimarc Corporation

(57) ABSTRACT

Digital watermarking technology is used in an image management system. Images are uniquely identified by digital watermarks. The images are stored so as to be indexed according to their unique identifiers. In the preferred embodiment, related images are linked together by the unique watermark identifier. The unique watermark identifiers are also used to manage metadata, and provide forensic tracking.

15 Claims, 6 Drawing Sheets

U.S. PATENT DOCUMENTS

| | | | |
|---|---|---|---|
| 5,919,730 A | 7/1999 | Gasper et al. | |
| 5,930,369 A | 7/1999 | Cox | 380/54 |
| 5,943,422 A | 8/1999 | Van Wie et al. | |
| 5,958,051 A * | 9/1999 | Renaud et al. | 713/200 |
| 5,964,821 A | 10/1999 | Brunts et al. | 701/201 |
| 5,987,136 A | 11/1999 | Schipper et al. | |
| 5,990,826 A | 11/1999 | Mitchell | 342/357.06 |
| 6,005,936 A | 12/1999 | Shimizu | |
| 6,031,914 A | 2/2000 | Tewfik et al. | |
| 6,081,827 A | 6/2000 | Reber et al. | |
| 6,088,394 A | 7/2000 | Maltby | |
| 6,122,403 A | 9/2000 | Rhoads | 382/233 |
| 6,141,753 A * | 10/2000 | Zhao et al. | 713/176 |
| 6,148,091 A | 11/2000 | DiMaria | |
| 6,175,639 B1 | 1/2001 | Satoh et al. | |
| 6,181,802 B1 | 1/2001 | Todd | |
| 6,185,312 B1 | 2/2001 | Nakamura et al. | |
| 6,233,684 B1 * | 5/2001 | Stefik et al. | 713/176 |
| 6,236,971 B1 * | 5/2001 | Stefik et al. | 705/1 |
| 6,243,480 B1 * | 6/2001 | Zhao et al. | 382/100 |
| 6,246,777 B1 | 6/2001 | Agarwal et al. | |
| 6,263,438 B1 | 7/2001 | Walker et al. | |
| 6,282,362 B1 | 8/2001 | Murphy et al. | 386/46 |
| 6,282,648 B1 | 8/2001 | Walker et al. | |
| 6,289,453 B1 | 9/2001 | Walker | |
| 6,301,360 B1 | 10/2001 | Bocionek et al. | 380/28 |
| 6,310,956 B1 | 10/2001 | Morito et al. | |
| 6,311,214 B1 | 10/2001 | Rhoads | |
| 6,320,829 B1 | 11/2001 | Matsumoto et al. | |
| 6,324,573 B1 * | 11/2001 | Rhoads | 709/217 |
| 6,332,149 B1 | 12/2001 | Warmus et al. | |
| 6,332,193 B1 * | 12/2001 | Glass et al. | 713/170 |
| 6,341,350 B1 | 1/2002 | Miyahara et al. | |
| 6,343,138 B1 * | 1/2002 | Rhoads | 382/100 |
| 6,351,439 B1 | 2/2002 | Miwa et al. | |
| 6,398,245 B1 * | 6/2002 | Gruse et al. | 280/228 |
| 6,408,082 B1 | 6/2002 | Rhoads et al. | |
| 6,408,331 B1 * | 6/2002 | Rhoads | 709/217 |
| 6,411,725 B1 * | 6/2002 | Rhoads | 382/100 |
| 6,427,020 B1 * | 7/2002 | Rhoads | 382/100 |
| 6,463,416 B1 | 10/2002 | Messina | |
| 6,493,514 B1 | 12/2002 | Stocks et al. | |
| 6,498,984 B1 | 12/2002 | Agnew et al. | |
| 6,504,571 B1 | 1/2003 | Narayanaswami et al. | 348/231.99 |
| 6,505,160 B1 * | 1/2003 | Levy et al. | 704/270 |
| 6,522,770 B1 * | 2/2003 | Seder et al. | 382/100 |
| 6,529,615 B1 | 3/2003 | Hendrickson et al. | |
| 6,532,541 B1 * | 3/2003 | Chang et al. | 713/176 |
| 6,542,927 B1 | 4/2003 | Rhoads | |
| 6,590,996 B1 | 7/2003 | Reed et al. | |
| 6,614,914 B1 | 9/2003 | Rhoads | 382/100 |
| 6,618,484 B1 | 9/2003 | Van Wie | 380/232 |
| 6,650,761 B1 | 11/2003 | Rodriguez et al. | |
| 6,664,976 B1 * | 12/2003 | Lofgren et al. | 345/634 |
| 6,754,822 B1 * | 6/2004 | Zhao | 713/176 |
| 2001/0001854 A1 | 5/2001 | Schena et al. | |
| 2001/0019611 A1 | 9/2001 | Hilton | |
| 2001/0022667 A1 | 9/2001 | Yoda | |
| 2001/0023421 A1 | 9/2001 | Numao et al. | |
| 2001/0026377 A1 | 10/2001 | Ikegami | |
| 2001/0026616 A1 | 10/2001 | Tanaka | |
| 2001/0026629 A1 | 10/2001 | Oki | |
| 2001/0030759 A1 | 10/2001 | Hayashi et al. | |
| 2001/0031064 A1 | 10/2001 | Donescu et al. | |
| 2001/0033674 A1 | 10/2001 | Chen et al. | |
| 2001/0034835 A1 | 10/2001 | Smith | |
| 2001/0039546 A1 | 11/2001 | Moore et al. | |
| 2001/0046307 A1 | 11/2001 | Wong | |
| 2001/0051964 A1 | 12/2001 | Warmus et al. | |
| 2002/0001395 A1 | 1/2002 | Davis et al. | |
| 2002/0002679 A1 | 1/2002 | Murakami et al. | |
| 2002/0006212 A1 | 1/2002 | Rhoads et al. | |
| 2002/0009209 A1 | 1/2002 | Inoue et al. | |
| 2002/0044690 A1 | 4/2002 | Burgess | |
| 2002/0046178 A1 | 4/2002 | Morito et al. | |
| 2002/0059520 A1 | 5/2002 | Murakami et al. | |
| 2002/0069370 A1 | 6/2002 | Mack | |
| 2002/0080396 A1 | 6/2002 | Silverbrook et al. | |
| 2002/0095586 A1 | 7/2002 | Doyle et al. | |
| 2002/0095601 A1 | 7/2002 | Hind et al. | |
| 2002/0106105 A1 | 8/2002 | Pelly et al. | |
| 2002/0122564 A1 | 9/2002 | Rhoads et al. | |
| 2002/0124171 A1 | 9/2002 | Rhoads | |
| 2002/0124173 A1 | 9/2002 | Stone | |
| 2002/0135600 A1 | 9/2002 | Rhoads et al. | |
| 2002/0136531 A1 | 9/2002 | Harradine | |
| 2002/0147910 A1 | 10/2002 | Brundage et al. | |
| 2002/0159765 A1 | 10/2002 | Maruyama et al. | |
| 2002/0168069 A1 | 11/2002 | Tehranchi et al. | |
| 2003/0011684 A1 | 1/2003 | Narayanaswami | |
| 2003/0012562 A1 | 1/2003 | Lawandy et al. | |
| 2003/0032033 A1 | 2/2003 | Anglin et al. | |
| 2003/0040326 A1 | 2/2003 | Levy et al. | |
| 2003/0048908 A1 | 3/2003 | Hamilton | |
| 2003/0053654 A1 | 3/2003 | Patterson et al. | |
| 2003/0069693 A1 | 4/2003 | Snapp et al. | |
| 2003/0074556 A1 | 4/2003 | Chapman et al. | |
| 2003/0090690 A1 | 5/2003 | Katayama et al. | |

FOREIGN PATENT DOCUMENTS

| | | |
|---|---|---|
| EP | 0 953 938 A2 | 11/1999 |
| EP | 935 872 | 11/2001 |
| EP | 1220152 | 7/2002 |
| GB | 2371934 | 8/2002 |
| JP | 2000 41144 A | 2/2000 |
| WO | WO 99/17537 | 4/1999 |
| WO | WO 01/05075 | 1/2001 |
| WO | WO01/24113 | 4/2001 |
| WO | WO01/39121 | 5/2001 |
| WO | WO01/76253 | 10/2001 |
| WO | WO02/03328 | 1/2002 |
| WO | WO02/33650 | 4/2002 |

OTHER PUBLICATIONS

U.S. Appl. No. 09/503,881, filed Feb. 14, 2000, Rhoads et al.

U.S. Appl. No. 09/452,023, filed Nov. 30, 1999, Rhoads.

Bender et al., "Techniques for Data Hiding," SPIE vol. 2420, Jan. 1995, pp. 164-173.

Friedman, "The Trustworthy Digital Camera: Restoring Credibility to the Photographic Image," IEEE Transactions on Consumer Electronics, vol. 39, No. 4, Nov. 1993, pp. 905-910.

Koch et al., "Digital Copyright Labeling: Providing Evidence of Misuse and Tracking Unauthorized Distribution of Copyrighted Materials," OASIS Magazine, Dec. 1995, 3 pages.

Manjunath, "Image Processing in the Alexandria Digital Library Project," Proc. IEEE Int. Form on Research and Tech. Advances in Digital Libraries—ADL '98, pp. 180-187.

U.S. Appl. No. 10/371,995, filed Feb. 20, 2003, Rhoads et al.

Caronni, "Assuring Ownership Rights for Digital Images," Published in the Proceedings of 'Reliable IT Systems,' VIS '95, HH. Brüggemann and W. Gerhardt-Häckl (Ed.), Vieweg Publishing Company, Germany, 1995, Jun. 14, 1994, 10 pages.

Carp, "Seven wonders of the imaging world", International Contact, Oct./Nov. 2000, pp. 36/I-36/IV.

"Digital Watermarking, The Unseen Advantage" Geo Informatics, Jun. 2001 (3 pages).

"Invisible Watermarking", http://web.archive.org/web/20010305033241/http://www.kodak.com/country/US/en/corp/researchDevelopment/technologyFeatures/digitalWatermarking.shtml, archive date of Mar. 5, 2001 (4 pages, including Internet Archive Wayback Machine cover page).

Seybold Seminars: Keynote: Digital Imaging Day, comments from panel including Daniel Carp, panel discussion occurring on Aug. 28, 2000 (8 pages).

Yeung et al., "Digital Watermarks: Shedding Light on the Invisible," Nov.-Dec. 1998, IEEE Micro vol. 18, No. 6, pp. 32-41.

Zhao et al., "Embedding Robust Labels Into Images for Copyright Protection," Proc. of the International Congress on Intellectual Property Rights for Specialized Information, Knowledge and New Technologies (Vienna, Austria) Aug. 21-25, 1995, 10 pages.

Zhao, "Digital Watermark Mobile Agents," Proc. of NISSC'99, Arlington, VA, Oct. 18-21, 1999, pp. 138-146.

Digimare, Frequently Asked Questions About Digimare Signature Technology, Aug. 1995.

Bender, "Techniques for Data Hiding" SPIE vol. 2420, pp. 164-173 (1995).

* cited by examiner

IMAGE MANAGEMENT SYSTEM AND METHODS USING DIGITAL WATERMARKS

RELATED APPLICATION DATA

This patent application claims the benefit of U.S. Provisional Application Nos. 60/284,163 filed Apr. 16, 2001, entitled "Watermark Systems and Methods," and 60/284,776 filed Apr. 18, 2001, entitled "Using Embedded Identifiers with Images." This application is also a continuation-in-part of assignee's U.S. patent application Ser. No. 09/800,093 (published as US 2002-0124171 A1), entitled "Geo-Referencing of Aerial Imagery Using Embedded Image Identifiers and Cross-Referenced Data Sets," filed Mar. 5, 2001.

This patent application is also related to assignee's U.S. patent application Ser. No. 09/833,013 (published as US 2002-0147910 A1), entitled "Digitally Watermarked Maps and Signs and Related Navigational Tools," filed Apr. 10, 2001.

FIELD OF THE INVENTION

The present invention relates to image management and processing, and is particularly illustrated in the context of a satellite and other aerial imagery management system.

BACKGROUND AND SUMMARY OF THE INVENTION

Aerial imagery has vastly improved since the Wright brothers first took to the sky. Indeed, there have been many improvements in the photography and digital imaging fields.

While the earliest aerial imagery relied on conventional film technology, a variety of electronic sensors are now more commonly used. Some collect image data corresponding to specific visible, UV or IR frequency spectra (e.g., the MultiSpectral Scanner and Thematic Mapper used by the Landsat satellites). Others use wide band sensors. Still others use radar or laser systems (sometimes stereo) to sense topological features in 3 dimensions. Some satellites even collect ribbon imagery (e.g., a raster-like, 1-demensional terrestrial representation, which is pieced together with other such adjacent ribbons).

The quality of the imagery has also constantly improved. Some satellite systems are now capable of acquiring image and topological data having a resolution of less than a meter. Aircraft imagery, collected from lower altitudes, provides still greater resolution.

A vast amount of aerial imagery is constantly being generated and collected. Management of the resulting large data sets is a growing problem. In today's digital world, images are routinely manipulated, even on home computers. Management of resulting image ancestry, image derivates and related metadata is increasingly difficult.

According to one aspect of the present invention, a digital watermark-based image management system helps solve these and other problems. A digital watermark is ideally employed as an enabler to access a related family of images, linked in a database (or other data structure) via digital watermark identifiers. Watermark identifiers can also be used to identify the source of an image, track images and documents, document a distribution chain, and identify unlabeled hard copy images. According to another aspect, digital watermarks help to provide security, monitoring and gatekeeper-like functions.

Digital watermarking is a form of steganography that encompasses a great variety of techniques by which plural bits of digital data are hidden in some other object without leaving human-apparent evidence of alteration.

Digital watermarking may be used to modify media content to embed a message or machine-readable code into the content. The content may be modified such that the embedded code is imperceptible or nearly imperceptible to the user, yet may be detected through an automated detection process.

Most commonly, digital watermarking is applied to media such as images, audio signals, and video signals. However, it may also be applied to other types of data, including documents (e.g., through line, word or character shifting, through texturing, graphics, or backgrounds, etc.), software, multi-dimensional graphics models, and surface textures of objects.

The assignee's U.S. Pat. No. 6,122,403, and co-pending U.S. patent application Ser. No. 09/503,881, detail suitable digital watermarking techniques in which values of pixels, e.g., in a 100×100 pixel patch, can be slightly altered so as to convey a plural-bit payload, without impairing use of the pixel data for its intended purpose. The payload may be on the order of 2–256 bits, depending on the particular form of encoding (e.g., convolution, turbo, or BCH coding can be employed to provide some error-correcting capability), and the number of bits per pixel. Larger payloads can be conveyed through larger image patches. (Larger payloads can also be conveyed by encoding the information in a less robust fashion, or by making the encoding more relatively visible.). The watermark payload can convey an image identifier, and may convey other metadata as well. In some embodiments, the component image files are tagged both by digital watermark identifiers and also by conventional out-of-band techniques, such as header data, thereby affording data redundancy. Of course, there are many watermarking techniques known to those skilled in the art, and such may be suitably interchanged with the present invention.

Digital watermarking systems typically have two primary components: an embedding component that embeds the watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reading component extracts this information from the detected watermark. Commonly assigned U.S. application Ser. No. 09/503,881, filed Feb. 14, 2000, discloses various encoding and decoding techniques. U.S. Pat. No. 5,862,260 discloses still others.

Watermarking may be performed in stages, at different times. For example, a unique identifier can be watermarked into an image relatively early in the process, and other information (such as finely geo-referenced latitude/longitude) can be watermarked later. A single watermark can be used, with different payload bits written at different times. (In watermark systems employing pseudo-random data or noise (PN), e.g., to randomize some aspect of the payload's encoding, the same PN data can be used at both times, with different payload bits encoded at the different times.).

Alternatively, different watermarks can be applied to convey different data. The watermarks can be of the same general type (e.g., PN based, but using different PN data). Or different forms of watermark can be used (e.g., one that encodes by adding an overlay signal to a representation of the image in the pixel domain, another that encodes by slightly altering DCT coefficients corresponding to the image in a spatial frequency domain, and another that encodes by slightly altering wavelet coefficients corresponding to the image. Of course, other watermarking techniques may be used as suitable replacements for those discussed above.).

In some multiple-watermarking approaches, a first watermark is applied before a satellite image is segmented into patches. A later watermark can be applied after segmentation. (The former watermark is typically designed so as to be detectable from even small excerpts of the original image.)

A watermark can be applied by an imaging instrument. In some embodiments, the image is acquired through an LCD optical shutter, or other programmable optical device, that imparts an inconspicuous patterning to the image as it is captured. (One particular optical technique for watermark encoding is detailed in U.S. Pat. No. 5,930,369.). Or the watermarking can be effected by systems in a satellite (or other aerial platform) that process the acquired data prior to transmission to a ground station. In some systems, the image data is compressed for transmission-discarding information that is not important. The compression algorithm can discard information in a manner calculated so that the remaining data is thereby encoded with a watermark.

A ground station receiving the satellite transmission can likewise apply a watermark to the image data. So can each subsequent system through which the data passes, if desired.

Preferably, such watermarking processes are secure and cannot be replicated by unauthorized individuals.

The foregoing and additional features and advantages of the present invention will be more readily apparent from the following detailed description with reference to the following figures.

DETAILED DESCRIPTION

For expository convenience, the following discussion focuses on satellite and other aerial "imagery" to illustrate the principles of the invention. The principles of the invention, however, are equally applicable to other forms of imagery, including non-aerial imagery. Accordingly, the term "image" should be used to encompass other data sets, and the term "pixel" should be construed to encompass component data from such other data sets. The term "image" should also be construed to include both digital and analog data sets.

Watermarking Images

Figure 1:
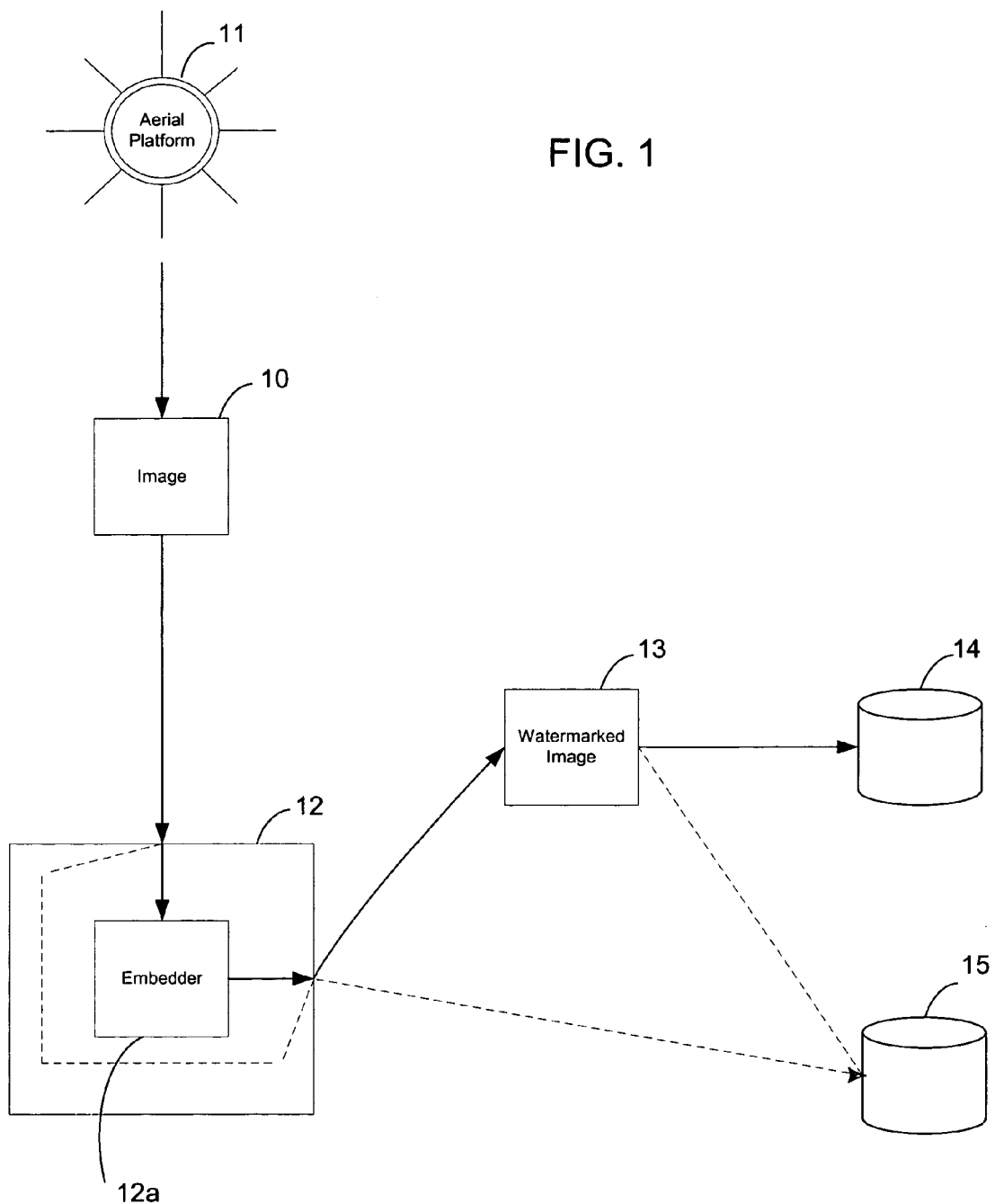
FIG. 1 is a functional block diagram illustrating a digital watermarking process.

With reference to FIG. 1, an image (or image data) 10 is captured from an aerial platform 11, such as an aircraft, satellite, balloon, unmanned aircraft, etc. The image 10 is communicated to a receiving or ground station 12. (In some instances, the image signal may be relayed through various aerial and/or other ground stations before reaching ground station 12.). Ground station 12 preferably includes a watermark embedder 12a, which embeds a digital watermark with the image 10, to produce a digitally watermarked image 13.

A digital watermark is typically embedded in a digital representation of the image 10. Although not required, the digital watermark preferably survives transformation to various analog representations (e.g., printing) as well. The digital watermark includes a watermark identifier (ID). In the preferred embodiment, each image is digitally watermarked to include a unique watermark ID. The ID typically includes plural-bit data, e.g., in the range of 2–256 bits. In one embodiment, a digital watermark (and identifier) is redundantly embedded within an image to improve robustness. For example, an image is divided into tiles or sections, and each tile or section is embedded with the digital watermark (and ID). Alternatively, a subset of the sections are embedded. Such techniques help to ensure the robustness of a watermark, particularly when an image is to be manipulated (e.g., clipped, cut-and-pasted, resized, rotated, etc.).

Digitally watermarked image 13 is stored in a database 14. (A watermarked image can be directly communicated to database 14, transferred via a storage medium and/or relayed to database 14.). Database 14 preferably manages images and/or related data. Database software, e.g., such as provided by Microsoft, Oracle, Sun Microsystems, etc., can be executed by a computer or server to help maintain database 14. Of course, database 14 can be maintained by a ground station 12 system, or be maintained in a remotely located network. In one embodiment, database 14 communicates with a network, such as a LAN, WAN, dedicated network, private network, etc. In some embodiments, database 14 includes a plurality of databases. In this case, at least one database maintains image data, while at least a second database maintains related information (e.g., metadata, related files, comments, file history, and/or security clearance information, etc.). Here, metadata is broadly defined to include a variety of information such as creation data, geo-location information, ancestry data, security information, access levels, copyright information, security classifications, usage rights, and/or file history, etc.

Image 13 and/or any related information is preferably stored and indexed according to watermark IDs. For example, a watermark ID provides a thread by which images and related information are grouped, stored and/or indexed. (The dashed lines in FIG. 1 represent this optional embodiment.).

Optionally, image data is communicated to a second database 15. Database 15 can be used to maintain original image 10 and/or an original watermarked image 13.

Image and Derivative Image Management Using Digital Watermarks

As indicated above, a problem faced by image management systems is how to efficiently manage an image's ancestry and related information. Normal image processing (e.g., scaling, cropping, rotating, clipping, resizing, cut-and-pasting image blocks, and/or marking, etc.) of an "original" image results in a "derivative" image. In conventional systems, derivative images frequently retain minimal, if any, related metadata. The metadata, such as that stored in header or footer files, is easily separable from derivative images. Separation results in a significant loss of information, particularly for a derivative image. One conventional solution is to manually record an image identifier as an image moves through an exploitation (or derivative) process. This manual recording process is labor intensive and cumbersome at best.

Figure 2:
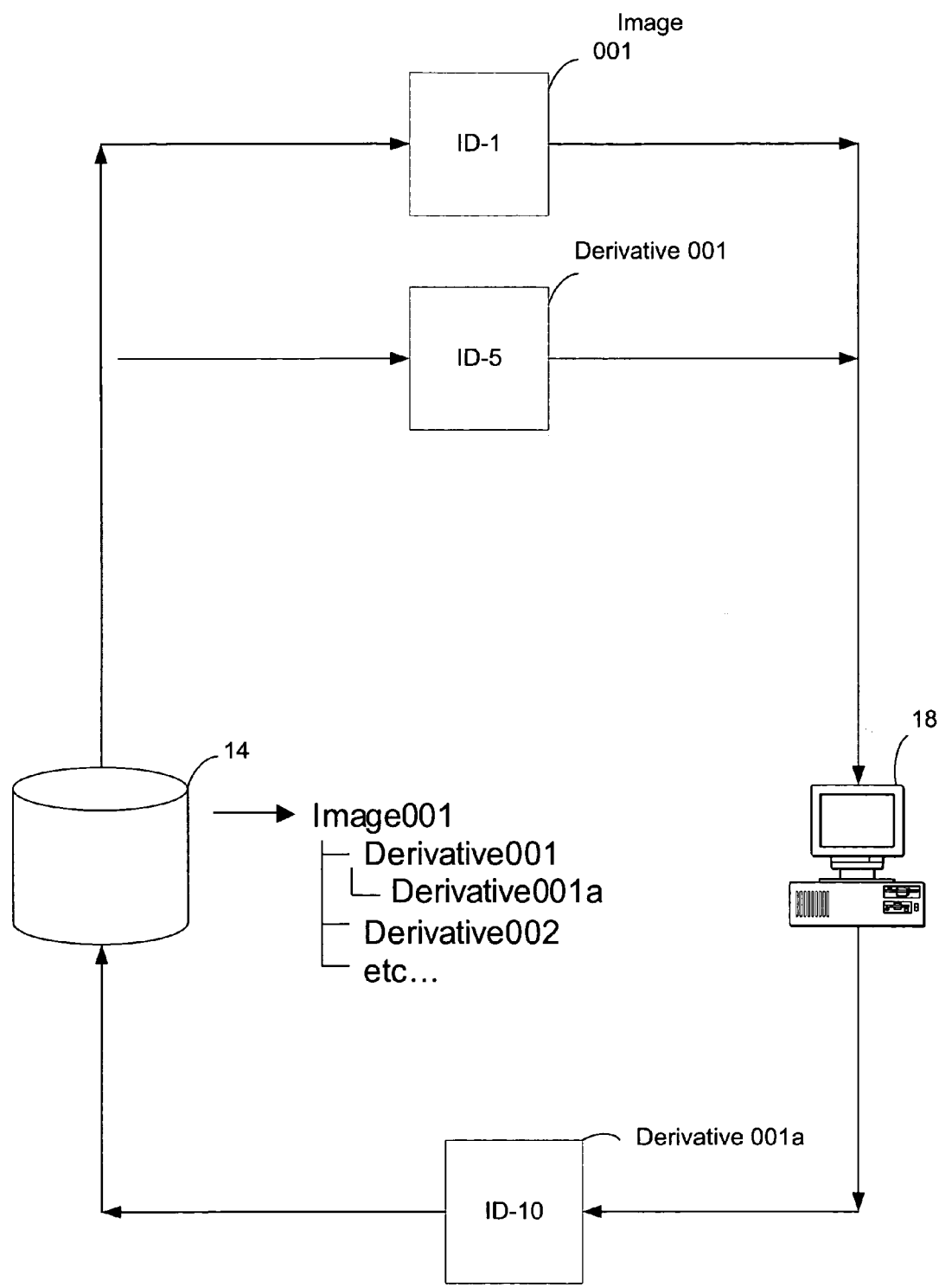
FIG. 2 illustrates components of an image management system.

A better solution, as disclosed in this application, is to place a unique digital watermark ID within an image to enable database linking and indexing. Metadata contained within the database can be then associated with a specific image, or with a family of images, via the unique watermark ID. With reference to FIG. 2, a user terminal 18 retrieves a digitally watermarked image 001 from database 14. User terminal 18 preferably includes a processor, memory and suitable software instructions to facilitate digital watermark detection and/or embedding. The user terminal 18 will preferably include an operating system, such as Windows, Windows NT, Linux, etc., and image-handling (and editing) software. Suitable image-handling software can be obtained from Microsoft, Adobe, SRI and Erdas, among others. Preferably, both the watermark detecting software and the image-handling software are compatible with various types of image formats, such as bit-maps, JPEG files, TIF files, etc. (However, such compatibility is not required.).

Watermark detection software executing in user terminal 18 analyzes image 001. The watermark detection software can be called by the imaging software, may operate as a plug-in, or may be even integrated with the image-handling software, operating system, or other software module. The watermark detection software extracts the unique watermark identifier (e.g., ID-1) embedded within image 001. Having obtained the identifier (ID-1), the user terminal 18 can optionally communicate with database 14 to retrieve related information, such as metadata, files, and related images. For example, the watermark ID-1 is used to interrogate database 14 to retrieve information regarding the geo-coordinates for the image, the time and date taken, analyst comments, and/or analyst information, etc. Preferably, the watermark ID-1 can also be used to index any derivative images, e.g., derivative 001. (In this case, derivative 001 is an image derived from image 001.).

In a preferred embodiment, since each image includes a unique identifier, derivative 001 includes a watermark identifier (e.g., ID-5), which is unique from the corresponding original image 001 (e.g., identifier ID-1). Derivative 001 and image 001 are associated (e.g., linked) together in database 14, via identifier ID-1 (and, optionally, via ID-5).

In some instances, user terminal 18 will create additional derivatives. Take for instance, an example when user terminal 18 enlarges the derivative 001 image, thus creating a new derivative 001*a*. This new derivative is preferably uniquely identified with a digital watermark. A process of digitally watermarking a derivative typically involves removing the original watermark from the derivative and replacing the watermark with a new unique identifier. (In an alternative embodiment, the original watermark is altered, e.g., by changing one or more message bits, to create the new unique identifier. In another embodiment, a second watermark is added to the derivative image to complement the first (or more) watermark. In this case, the first watermark identifies the original image, and the second watermark identifies the derivative.). Preferably, upon creating derivative 001*a*, the digital watermarking software removes the derivative 001 watermark (or at least a portion of the watermark, e.g., identifier ID-5) from the derivative 001 image. Assignees' U.S. application Ser. No. 09/503,881 discusses some techniques for such. Artisans know others still. Derivative 001*a* is then embedded with a unique digital watermark identifier (e.g., ID-10).

The watermark embedding software can determine an appropriate identifier in a number of ways. In one embodiment, the embedding software queries database 14 for an appropriate, or available, identifier. In another case, embedding software (or user terminal 18) is assigned a range of identifiers, and an identifier is chosen from the available range. In still another embodiment, the embedding software randomly or pseudo-randomly selects the identifier, or alters a portion of the original image identifier, e.g., 2–32 bits of the original watermark identifier.

An image and a watermark identifier are combined to produce a digitally watermarked image (or derivative image) preferably in the same format and density as the input image. As an optional feature, software provides an indicator to signal success or failure in the watermarking effort. For example, the software can analyze whether the watermark was embedded, and/or whether the image contains the same format and density as the original input image. Upon a failure, user terminal 18 re-embeds the digital watermark or aborts the process.

Derivative image 001*a* is stored in database 14. Related information can also be stored in database 14. (As discussed above, database 14 may include a plurality of databases. One such database may manage images, while another database manages related information. Preferably, however, the unique identifiers are used consistently between the plurality of databases to link related images and information.). Database 14 links derivative 001*a* with image 001, derivative 001 and any related information (e.g., metadata, comments, files, history, security, etc.). Accordingly, image ancestry and any related information is efficiently maintained.

Figure 3:
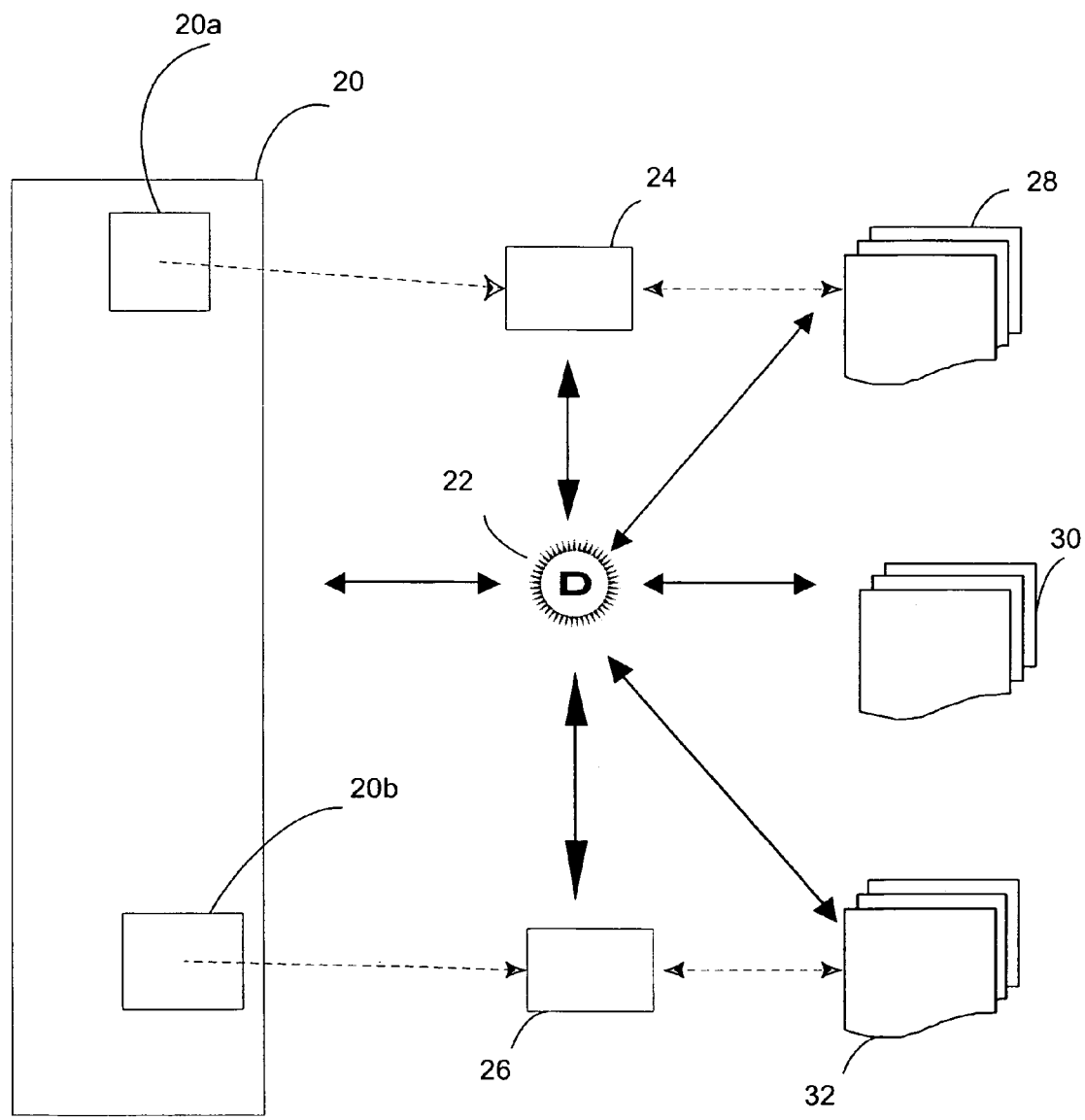
FIG. 3 illustrates associating related images and information with a digital watermark identifier.

FIG. 3 is a diagram further illustrating linking images, derivatives and related information via a unique watermark identifier. An original image 20 is watermarked with a unique identifier 22. A first derivative image 24 (e.g., perhaps an enlarged or cropped image corresponding with area 20*a*) and a second derivative 26 (e.g., corresponding to area 20*b*) are created. Each of the first derivative 24 and second derivative 26 are encoded with a unique watermark identifier. The derivative identifiers are associated with the unique identifier 22 in database 14. Such linking effectively groups image families together, permitting a user to gain access to image ancestry. Similarly, related information can be linked via unique identifier 22. Returning to FIG. 3, related information 28 corresponding to first derivative 24 are linked to identifier 22. Files 30 corresponding to the original image 20, as well as files 32 for the second derivative 26, are likewise linked. Accordingly, entire image families (and related information) are efficiently maintained by linking via the unique identifier 22. Of course, files 28 and 30 optionally can be separately, and respectively, linked to derivatives 24 and 26, via the derivatives' unique identifiers (e.g., as shown by the dashed lines in FIG. 3).

Security and Rewritable Watermarks

In one embodiment, a watermark provides information related to a permission level or a security clearance level. Such information can be reflected in a unique identifier or in a payload message. Alternatively, the watermark identifier can be used to interrogate a database to retrieve related security level requirements. Such security information can be used to regulate access to images and related information. For example, only users (or user terminals) having a corresponding permission level or security clearance are allowed to access the corresponding image. Suitable software instructions can examine the permission level (or security clearance) to determine whether a user (or terminal) has the necessary clearance.

One aspect of the present invention is to employ "rewritable" watermarks. A rewritable watermark includes a watermark of which all or a portion of which may be changed. In a preferred embodiment, only a portion (e.g., a portion of the payload) of a watermark is rewritten to update permission levels, reflect derivative work, etc.

There are often situations where it is desirable to carry some form of security access indicator in an image, e.g., via a digital watermark. The security access indicator defines a level of security required to view, edit or comment with respect to an image. Access to the image is then controlled by appropriately enabled software, which extracts the indicator (or receives the indicator from a watermark decoder) and determines usage. In one embodiment, the indicator indicates or defines a required level. If a user's security level is equal to or greater (e.g., as determined from a password, user terminal identifier, login, linked security clearance level, etc.) to that carried in a security access indicator, then a user is allowed access to the image or data. In another embodiment, a security code may indicate that a particular user can view the image, but cannot edit or store comments regarding such.

Consider the following example. An image "A" is defined to include an "unclassified" security classification. Image A's watermark then includes a unique identifier and additional plural-bits set to a predetermined number, e.g., all set to zero (or to a predetermined number or pattern). These additional plural-bits define the unclassified security classification. An image "B" is a derivative of image A, and has a "secret" security classification encoded in the plural-bits. Before either image A or B is opened (or requested) the security level contained within the watermark is validated against the security level of the individual requesting access, and permission is only granted to those with adequate clearance. In one embodiment, local software (e.g., executing on a user terminal) validates the security access by decoding the watermark, extracting the security bits, and comparing the security bits (or corresponding security level) with the security clearance of a user (or terminal). In another embodiment, software running on a central server monitors and validates security access. Or in another embodiment software associated with the database regulates the security access.

Application Interface

Application interface software, residing on a user terminal, helps to facilitate communication between image-handling software and database 14. The interface can be incorporated in such image-handling software, operate as a plug-in, be integrated with the operating system, or may even be called by certain operations (e.g., data retrieval, editing, saving, etc.). Preferably, the interface generates (or works in connection with) a graphical user interface (GUI) for a user. The GUI helps to facilitate user login, data retrieval, and image creation and saving. Creation is defined broadly to include any alteration to an existing image, or generation of a new image. Initially, a user is requested to enter a password or pass code to interact with database 14. After a successful log in, user access is preferably regulated based on security clearance. In other embodiments, permission levels or payment schedules are used to regulate access. An image, and related metadata, files, etc., should only be accessible when security access is permitted. In one embodiment, an image is selected from a directory, and the selected image is examined for watermarks. A watermark is extracted and security bits are determined. The security bits are validated against a corresponding security access allowed for the logged-on user. A user is permitted to access (e.g., retrieve, open, or edit) the image if she has an appropriate clearance. In an alternative arrangement, a database is queried to determine the security level required for all (or a subset of all) possible images in a directory or list. Only those images corresponding to the user's security clearance (or permission) are presented as options to open for the user. Even the names of the images can be screened from a user if her security clearance is insufficient.

The interface also facilitates communication in a normal image editing and creation processes. Preferably, the interface will be invoked as part of a saving process.

The creation process typically involves determining a new image identifier. As discussed above, there are many ways to determine an image identifier. In one case, the interface queries the database 14 to obtain a new image identifier. The retrieved image identifier is embedded in the newly created image as a portion of a digital watermark. The embedded image is then saved in database 14. Optionally, the database will signal that the save operation has been successfully completed. In the case of derivatives, the database is preferably updated to indicate that the new image identifier is related (or linked) to the identifier of an original image.

In one embodiment, the above-mentioned steps (e.g., creating, watermarking, and saving) are considered a transaction, e.g., where all of the steps must be carried out for the transaction to be complete.

Sentry

Figure 4:
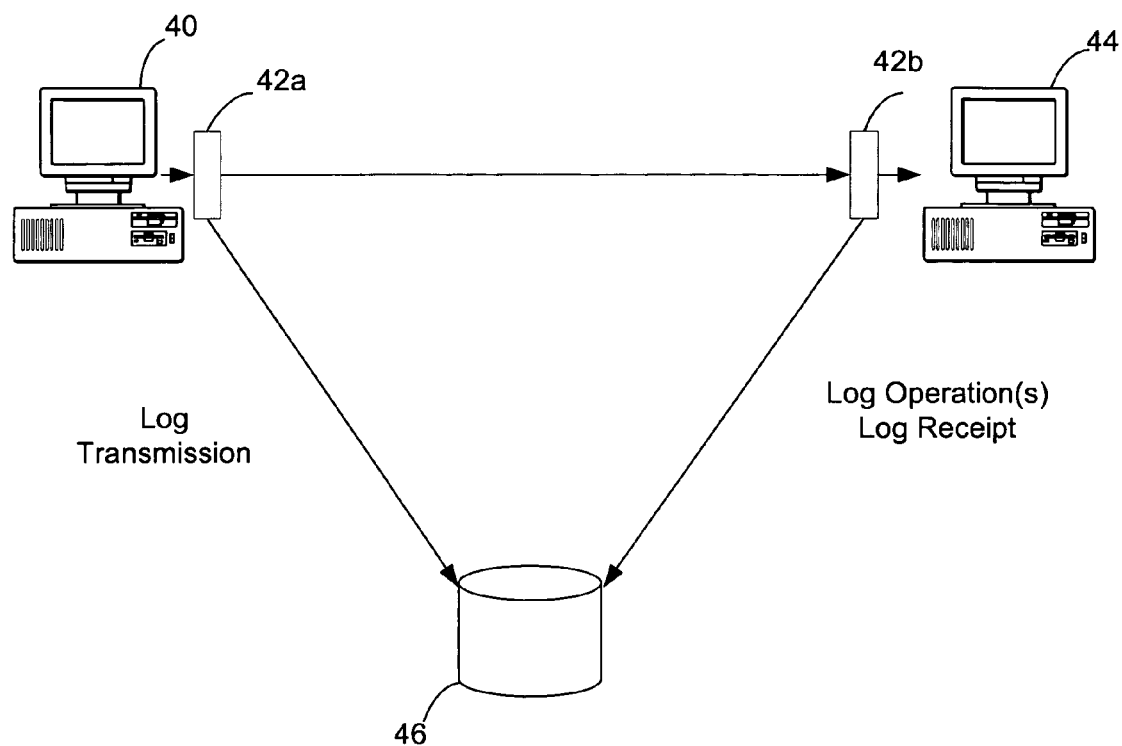
FIG. 4 is a functional block diagram illustrating gatekeepers in a network.
Figure 5:
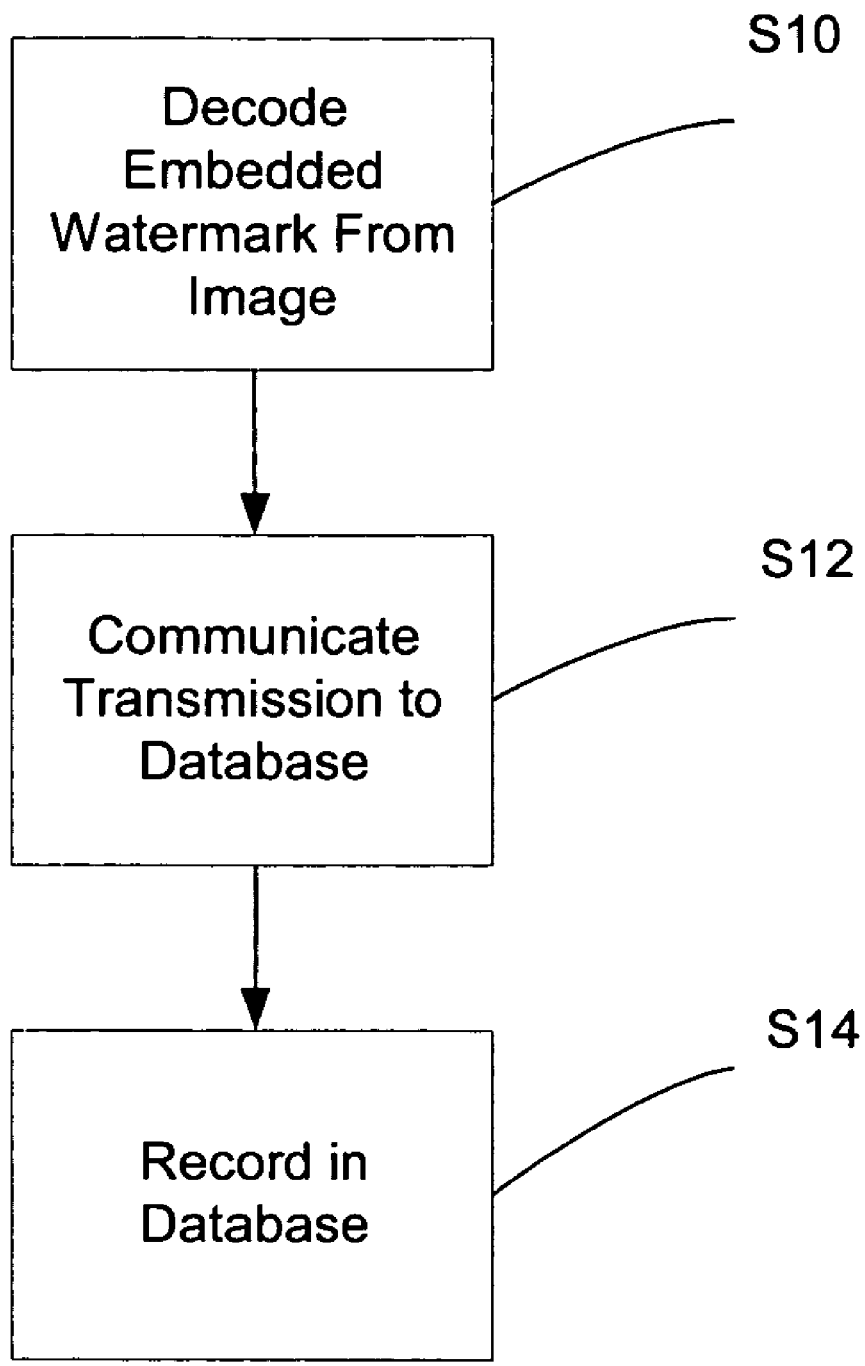
FIGS. 5 and 6 are flow diagrams illustrating gate-keeping methods and processes according to the FIG. 4 embodiment.

Another aspect of the present invention is a gatekeeper module. With reference to FIG. 4, a gatekeeper (or "sentry") 42 resides on network terminals 40 and 44. Terminals 40 and 44 communicate, e.g., via a network, direct link, e-mail, etc. Sentry 42 monitors the flow of digital watermarked images and related information by extracting digital watermark identifiers or embedded security information from transmitted images. The sentry 42 can compare extracted information against user (or terminal) security clearance information. In one embodiment, sentry is an independent software module, although sentry 42 may be incorporated into other software components (e.g., applications, operating system, etc.) of a network terminal 40 and 44. Sentry 42 monitors and controls the flow of images at various points in a network system. Such activity is logged (e.g., recorded, stored, etc.) in database 46. To monitor an image transmitted from user terminal 40 to user terminal 44, sentry 42a decodes an embedded watermark identifier from an image to be transferred (step S10, FIG. 5). The identifier, destination address, and optionally a date/time stamp are communicated to database 46 (step S12), where such information is recorded as a data record (or file, log, table, database entry, history, etc.) as in step S14. Preferably such transmission activity is associated with the unique identifier of the transferred image.

Figure 6:
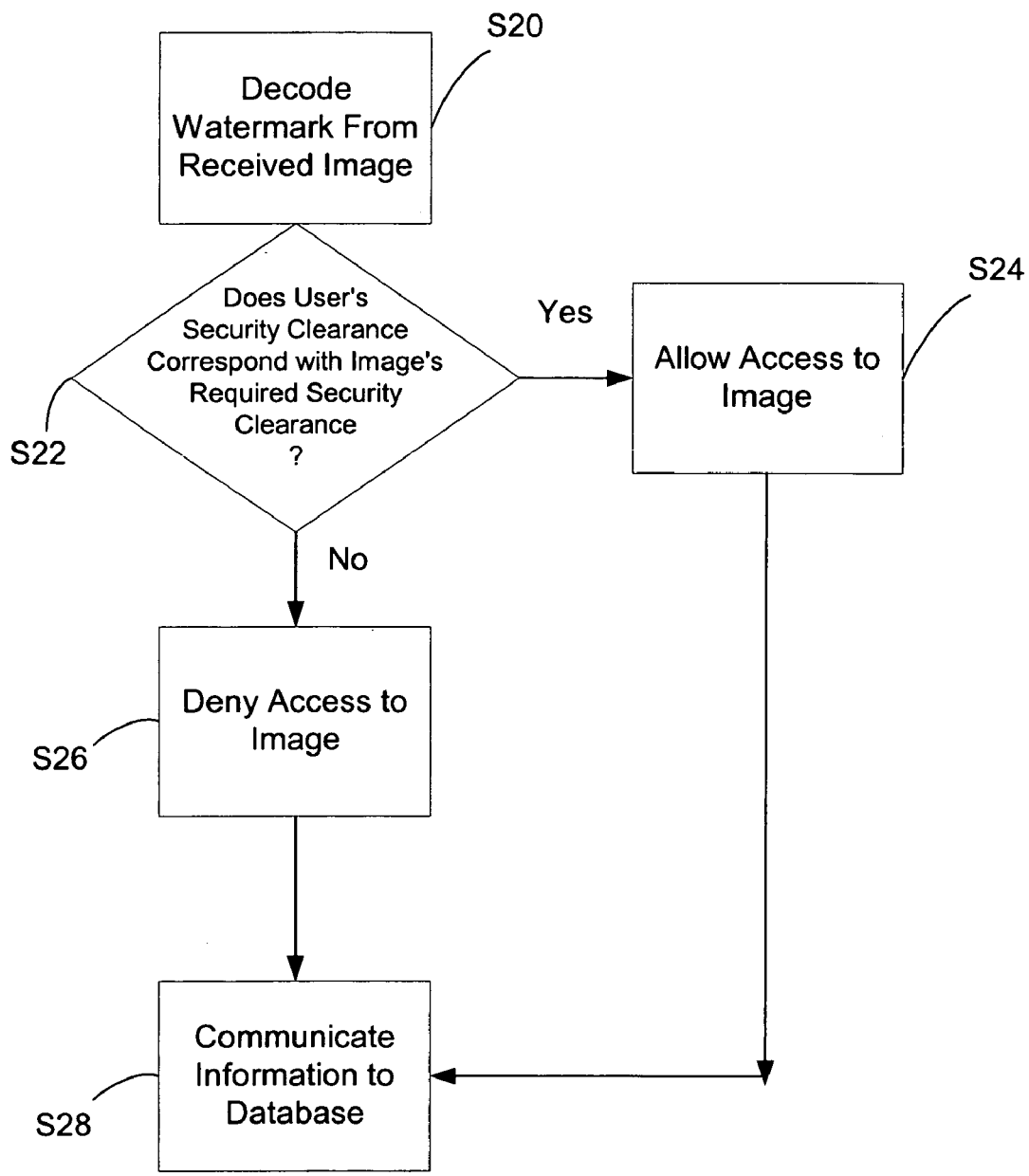

Sentry 42 is also gatekeeper in that it analyzes whether a user's security or permission level is sufficient to receive a watermarked image into or from a workstation (e.g., whether terminal 44 can receive the image transmitted from terminal 40). Sentry 42b preferably includes watermark-decoding software, which extracts unique identifiers (and any security bits) from watermark images (step S20, FIG. 6). If the security level of an image is stored in a database, sentry 42b queries the database with the identifier to determine the required access level. Or if the watermark includes security bits, then sentry 42b determines an access level directly from extracted security bits. Sentry 42b determines whether the user's security clearance sufficiently corresponds with the received image's clearance requirements (step S22). If so, sentry 42b allows terminal 44 to receive and open the subject image (step S24). If not, sentry 42b denies terminal 44 access to the image (step S26). In either case, sentry 42b preferably communicates such information to database 46 (step S28). For example, sentry 42b records whether the image is passed to terminal 44, or whether the image is denied. (As an optional function, sentry 42b notifies terminal 42 regarding the delivery status of the image.).

Preferably, sentry 42 does not performed the function of managing the relationship between images and their derivatives, as this is the function of the file save software associated with the image editing application. However, in one embodiment, sentry 42 is combined with an application interface.

Sentry 42 can be deployed in a number of ways. In one embodiment, sentry 42 is integrated (or stored, or connected) to a workstation or server in such a way that all image data must first pass through the sentry 42. In another embodiment, sentry 42 includes a separate hardware (or hardware/software) device inserted between a network (or network connection) and a user terminal. As such, sentry 42 decodes watermarks and intercepts passwords from image traffic before the user terminal receives the image, or directly after transmitting an image.

In another embodiment, e.g., in a TCP/IP environment, a sentry 42 is deployed as software within a TCP/IP stack in the user station or server. In yet another embodiment, a sentry is incorporated in (or called by) an image-handling program's open, save and close operations.

When used in connection with a database history or other record, sentry 42 provides efficient tracking and tracing. Since the history file reveals each use (and printing, transmission, etc.) of a watermarked image, the image can be efficiently tracked as it passes from terminal to terminal, or from database to terminal, etc.

Fragile Watermarks

Some images may include at least two watermarks. A first watermark includes a unique identifier, as discussed above. This identifier allows database inquires and association as discussed above. A second watermark can be applied prior to printing, faxing, etc. This second watermark preferably includes a so-called fragile watermark. That is, it is designed to be lost, or to degrade predictably, when the data set into which it is embedded is processed in some manner. (Fragile watermark technology is disclosed, e.g., in applications Ser. Nos. 09/234,780, 09/433,104, 09/498,223, 60/198,138, 09/562,516, 09/567,405, 09/625,577, 09/645,779, and 60/232,163.).

Once an image is printed, it then includes both the first and second watermarks. If the image is subsequently scanned back into a digital form, e.g., via a scanner, photocopier, web cam, digital camera, etc., the fragile watermark is corrupted (or destroyed) in a foreseeable manner. Printed copies can be tracked and traced accordingly. For example, a photocopied image is scanned into a digital form. The first watermark is used to identify the image and retrieve an image history (e.g., as created by a sentry or other logging method). Since the fragile watermark is destroyed (or predictably degraded) in the copy process, the photocopy is determined to be an unauthorized copy. The history log can be used to determine which user, or user terminal, printed the copy.

Conclusion

Watermarks can be applied to any data set (e.g., an image, map, picture, document, etc.) for forensic tracking purposes. This is particularly useful where several copies of the same data set are distributed through different channels (e.g., provided to different users). Each can be "serialized" with a different identifier, and a record can be kept of which numbered data set was provided to which distribution channel. Thereafter, if one of the data sets appears in an unexpected context, it can be tracked back to the distribution channel from which it originated.

In an alternative embodiment, with reference to FIG. 1, a digital watermark embedder is included in aerial platform 11. The aerial embedder embeds images (e.g., after or during capture) and relays such to ground station 12. In yet another embodiment, an image is digitally watermarked downstream from ground station 12, such as in a user terminal, or an embedder associated with the databases 14 and/or 15.

Although not belabored, artisans will understand that the systems described above can be implemented using a variety of hardware and software systems. One embodiment employs a computer or workstation with a large disk library, and capable database software (such as is available from Microsoft, Oracle, etc.). The watermarking and database operations can be performed in accordance with software instructions stored in the disk library or on other storage media, and executed by a processor in the computer as needed. (Alternatively, dedicated hardware, or programmable logic circuits, can be employed for such operations.)

The various section headings in this application are provided for the reader's convenience and provide no substantive limitations. The features found in one section may be readily combined with those features in another section.

To provide a comprehensive disclosure without unduly lengthening this specification, the above-mentioned patents and patent applications are hereby incorporated by reference. The particular combinations of elements and features in the above-detailed embodiments are exemplary only; the interchanging and substitution of these teachings with other teachings in this application and the incorporated-by-reference patents/applications are also contemplated.

It should be appreciated that the present invention is not limited to managing satellite and other aerial imagery. Indeed, other imagery may be managed with the present invention. Also, the present invention encompasses a "non-secure" type of system. In one such embodiment, watermark identifiers are used to link images and/or related information. A security or permission level is not required in such a system.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method for managing images, the images including a first image comprising a first identifier steganographically embedded therein, said method comprising:

retrieving a copy of the first image from an image database;

altering the copy of the first image to provide a second image;

steganographically embedding a second identifier in the second image; and providing the steganographically embedded second image to the image database for storage, wherein the image database associates the second identifier with the first identifier so as to associate the first image and the second image.

2. The method according to claim 1, further comprising removing the first identifier from the second image.

3. The method according to claim 1, further comprising altering the first identifier in the second image.

4. The method according to claim 1, further comprising storing information related to the first image in the database.

5. The method according to claim 4, wherein the related information comprises at least one of metadata, location, date, permission level, security access levels, analyst comments, notes, files, and past usage information.

6. The method according to claim 5, wherein the database comprises a plurality of databases.

7. A system comprising:
a first user terminal;
a second user terminal;
a database, wherein the first user terminal and the second user terminal are in communication, and the first user terminal and the second user terminal are each in communication with the database; and
a gatekeeper to regulate the flow of at least a first image between the first user terminal and the second user terminal, wherein the first image comprises at least a first digital watermark including a first identifier, said gatekeeper to determine a security level associated with the first image, compare the first image security level with a user security level, and to allow access by the second user terminal to the first image based on a result of the comparison, wherein said gatekeeper comprises or communicates with a digital watermark decoder to decode the digital watermark to determine the first identifier, and to interrogate the database with the first identifier to retrieve the security level.

8. The system according to claim 7, wherein the user security level comprises at least one of a security level for a user and a security level for a user terminal.

9. The system according to claim 7, wherein said gatekeeper records in the database a transmission of the first image from the first user terminal to the second user terminal.

10. The system of claim 7, further comprising a communications server, wherein the first user terminal and the second user terminal are in communication via said communications server.

11. A system comprising:
a first user terminal;
a second user terminal;
a database, wherein the first user terminal and the second user terminal are in communication, and the first user terminal and the second user terminal are each in communication with the database; and
a gatekeeper to regulate the flow of at least a first image between the first user terminal and the second user terminal, wherein the first image comprises at least a first digital watermark including a first identifier, said gatekeeper to determine a security level associated with the first image, compare the first image security level with a user security level, and to allow access by the second user terminal to the first image based on a result of the comparison, wherein said first image digital watermark includes security level data, and wherein said gatekeeper comprises or communicates with a digital watermark decoder to decode the digital watermark to determine the security level data.

12. The system according to claim 11, wherein the user security level comprises at least one of a security level for a user and a security level for a user terminal.

13. The system according to claim 11, wherein said gatekeeper records in the database a transmission of the first image from the first user terminal to the second user terminal.

14. The system of claim 11, further comprising a communications server, wherein the first user terminal and the second user terminal are in communication via said communications server.

15. An apparatus comprising:
electronic processing circuitry; and
memory,
said memory comprising records stored therein, the records comprising a plurality of images, the plurality of images including a first image and a second image,
wherein the first image includes a first identifier steganographically embedded therein, and
wherein the second image includes a second identifier steganographically embedded therein,
wherein the second image is derived from the first image, and
wherein the second identifier is associated with the first identifier so that the first image and the second image are associated with one another.

* * * * *